United States Patent
Stephan et al.

(10) Patent No.: US 10,979,750 B2
(45) Date of Patent: Apr. 13, 2021

(54) METHODS AND DEVICES FOR CHECKING THE VALIDITY OF A DELEGATION OF DISTRIBUTION OF ENCRYPTED CONTENT

(71) Applicant: ORANGE, Paris (FR)

(72) Inventors: Emile Stephan, Chatillon (FR); Frederic Fieau, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/478,343

(22) PCT Filed: Jan. 16, 2018

(86) PCT No.: PCT/FR2018/050100
§ 371 (c)(1),
(2) Date: Jul. 16, 2019

(87) PCT Pub. No.: WO2018/130796
PCT Pub. Date: Jul. 19, 2018

(65) Prior Publication Data
US 2019/0387264 A1    Dec. 19, 2019

(30) Foreign Application Priority Data
Jan. 16, 2017   (FR) ...................................... 1750326

(51) Int. Cl.
*G06F 15/16* (2006.01)
*H04N 21/258* (2011.01)
(Continued)

(52) U.S. Cl.
CPC ... *H04N 21/25816* (2013.01); *H04L 63/0823* (2013.01); *H04N 21/222* (2013.01);
(Continued)

(58) Field of Classification Search
CPC ........... H04N 21/25816; H04N 21/222; H04N 21/237; H04N 21/2541; H04N 21/25875; H04L 63/0823
(Continued)

(56) References Cited

U.S. PATENT DOCUMENTS

2003/0014503 A1    1/2003 Legout et al.

OTHER PUBLICATIONS

International Search Report dated Mar. 19, 2018 for corresponding International Application No. PCT/FR2018/050100, filed Jan. 16, 2018.
(Continued)

*Primary Examiner* — Wing F Chan
*Assistant Examiner* — Joseph R Maniwang
(74) *Attorney, Agent, or Firm* — David D. Brush; Westman, Champlin & Koehler, P.A.

(57) ABSTRACT

Checking a certificate of delegation, from a first server to a second server, for delivery of content referenced on the first server, and addressed to a client terminal. The terminal: emits a first message requesting the content, addressed to the first server, via a first encrypted connection; receives a redirection message from the first server, including an identifier of a third-party server; obtains an address from the second server, based on the identifier received in the redirection message; emits a request to establish a second encrypted connection between the terminal and the second server, including an identifier of the first server; receiving a certificate of delegation signed by the first server from the second server, via the second encrypted connection; verifies the certificate by an encryption key of the first server; and if valid, emits a second message requesting content, addressed to the second server, via the second encrypted connection.

11 Claims, 2 Drawing Sheets

Figure 1:
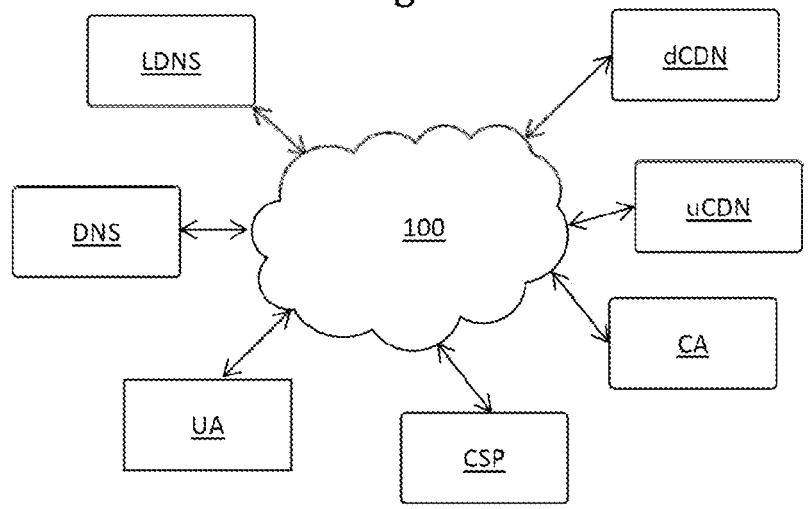

(51) Int. Cl.
  *H04L 29/06*    (2006.01)
  *H04N 21/222*   (2011.01)
  *H04N 21/237*   (2011.01)
  *H04N 21/254*   (2011.01)
(52) U.S. Cl.
  CPC ....... *H04N 21/237* (2013.01); *H04N 21/2541* (2013.01); *H04N 21/25875* (2013.01)
(58) Field of Classification Search
  USPC .......................................................... 709/229
  See application file for complete search history.

(56) References Cited

OTHER PUBLICATIONS

Liang Jinjin et al., "When HTTPS Meets CDN: A Case of Authentication in Delegated Service" 2014 IEEE Symposium on Security and Privacy, IEEE, May 18, 2014 (May 18, 2014), pp. 67-82, XP032686141.
Kim H. et al., "A Robust ad Flexible Digital Rights Management System for Home Networks", Journal of Systems & Software, Elsevier North Holland, New York, NY, US, vol. 83, No. 12, Dec. 1, 2010 (Dec. 1, 2010), pp. 2431-2440, XP027449644.
Written Opinion of the International Searching Authority dated Mar. 19, 2018 for corresponding International Application No. PCT/FR2018/050100, filed Jan. 16, 2018.
J. Reschke et al., "'Out-Of-Band' Content Coding for HTTP draft-reschke-http-oob-encoding-08", Sep. 26, 2016, https://tools.ietf.org/html/draft-reschke-http-oob-encoding-08.txt.
T. Dierks, "The Transport Layer Security (TLS) Protocol Version 1.2", RFC 5246, Aug. 2008.
J. Salowey et al., "Transport Layer Security (TLS) Session Resumption without Server-Side State", RFC 5077, Jan. 2008.

METHODS AND DEVICES FOR CHECKING THE VALIDITY OF A DELEGATION OF DISTRIBUTION OF ENCRYPTED CONTENT

CROSS-REFERENCE TO RELATED APPLICATIONS

This Application is a Section 371 National Stage Application of International Application No. PCT/FR2018/050100, filed Jan. 16, 2018, which is incorporated by reference in its entirety and published as WO 2018/130796 A1 on Jul. 19, 2018, not in English.

1. FIELD OF THE INVENTION

The patent application lies in the field of contents distribution networks, and more particularly in respect of encrypted contents.

2. PRIOR ART

An ever larger share of Internet traffic is transported over the TLS (Transport Layer Security) protocol, a protocol standardized by the IETF in RFC 5246 and making it possible to secure the exchanges between a client and a server.

TLS makes it possible to authenticate the server or the client, to encrypt the content of the exchanges between them and to verify the integrity thereof.

When a user wishes to consume a content on the Internet by way of the browser of his client terminal, a query is sent to a server of a content provider. Usually, this content provider delegates the delivery of the content to another server, chosen as a function of several criteria, such as for example the location of the client's terminal and the terms of the contract between the content provider and the operator of the other server, when this contract exists.

Despite the security afforded by TLS, the client terminal has no means of verifying the validity of this delegation. This is all the more problematic as the CDNs (Content Delivery Networks), to which the delivery of the content is delegated, are ever more numerous, and may delegate amongst themselves the delegation that they have received from a content provider, without the latter necessarily knowing it.

One of the aims of the invention is to remedy these drawbacks of the prior art.

3. DISCLOSURE OF THE INVENTION

The invention improves the situation with the aid of a method for verifying a delegation certificate, the delegation being from a first server to a second server, for delivery of a content referenced on the first server, and intended for a client terminal, the method comprising the following steps implemented by the terminal:

sending of a first query message in respect of the content, destined for the first server, through a first encrypted connection between the terminal and the first server and by means of which the terminal has previously obtained an encryption key associated with the first server, reception of a redirection message, comprising at least one identifier of a third-party server, obtaining of an address of the second server, on the basis of the at least one identifier received in the redirection message, sending of a request for establishment of a second encrypted connection between the terminal and the second server, comprising an identifier of the first server.

The verification method is particular in that it further comprises the following steps:

reception of a certification message originating from the second server, comprising a delegation certificate signed by the first server, through the second encrypted connection, verification of the delegation certificate with the aid of the encryption key associated with the first server, sending of a second query message in respect of the content, destined for the second server, through the second encrypted connection, if the verified delegation certificate is valid.

The verification method according to the invention enables the terminal to verify whether the delegation of delivery of the content by an encrypted connection is indeed valid.

When a terminal asks a content server for a content, and when this server has delegated the delivery of this content to a third-party server, the terminal receives from the first server a redirection message comprising an identifier of this third-party server, to which it has delegated the delivery of the content. With this identifier, the terminal obtains an address, which may be that corresponding to the identifier, but which may also be that of another server, to which the third-party server has itself delegated its role. One then speaks of multiple delegation. This second delegation to this other server, cascaded with the first, may be for example done with the aid of a simple DNS redirection, invisible from the first server.

In the prior art, for example based on https, on DNS, and on a certificate verification protocol such as OCSP (Online Certificate Status Protocol) or its variant OCSP Stapling, the terminal can assure itself that all the servers involved in the delegation chain are authenticated by a certifying authority, but nothing enables it to verify the validity of the second delegation, or a fortiori the validity of any following delegation, in case of multiple delegation with more than two levels.

By virtue of the verification method according to the invention, the terminal receives a delegation certificate from the second server, enabling it to decide whether or not to access the content, as a function of its verification of the certificate. This verification being done with the aid of a public key specific to the first server, the terminal can verify that the delegation certificate received from the second server has been established with the agreement of the first server.

Even in the simplest case, where there is no cascaded multiple delegation, that is to say in the case where the second server which delivers the content is the third-party server known to the first server, it may happen that the delegation has been revoked in the meantime by the first server, for any reason. By virtue of this method according to the invention, the terminal can verify that the delegation certificate received from the second server established validly at a given instant with the agreement of the first server, is still valid at the instant at which the terminal requests the content. Moreover, in this case, this method gives the second server an opportunity to renew its delegation certificate with the first server if it has become too old.

According to one aspect of the invention, the step of obtaining an address of the second server comprises a step of selecting the address from among the identifiers of third-party servers, and/or a step of interrogating an address resolution server with an identifier.

Advantageously, if the redirection message originating from the first server comprises a list of identifiers or of addresses, the terminal can select one of them according to its own criteria. Likewise if the redirection message originating from the first server comprises a domain name, the terminal can obtain an address on the basis of this name by performing a DNS query.

According to one aspect of the invention, the method further comprises a step of sending a second query message in respect of the content, destined for the second server, through the second encrypted connection, if the verified delegation certificate is valid.

Advantageously, the client terminal consumes the requested content through a connection with the second server, to which the first server has legitimately delegated delivery.

According to one aspect of the invention, the certification message further comprises a redirection instruction and where the method further comprises a step of redirecting the terminal to a third server.

Whether or not the delegation certificate is valid, that is to say whether or not the first server has agreed to delegate delivery to the second server, the first server can invite the terminal to connect to a server other than the second server rather than remain connected to the second server. This redirection server may be the first server, or a site or a server determined by the first server. The site may for example be an information page warning that the second server is not an appropriate server for delivering the requested content. The server may be an alternative delivery server, preferable to the second server.

The various aspects of the verification method which have just been described can be implemented independently of one another or in combination with one another.

The invention also relates to a method for producing a delegation certificate, the delegation being from a first server to a second server, for delivery of a content referenced on the first server, and intended for a client terminal, the method comprising the following steps implemented by the first server:
  reception of a query message in respect of the content, originating from the terminal, through a first encrypted connection between the terminal and the first server and by means of which the terminal has previously obtained an encryption key associated with the first server,
  sending of a redirection message destined for the terminal, comprising at least one identifier of a third-party server.

The production method is particular in that it further comprises the following steps:
  reception of a delegation certificate request message, originating from a second server, comprising an authenticity certificate of the second server,
  analysis of the request for a delegation certificate,
  as a function of the result of the analysis, sending of a delegation certificate response message, destined for the second server, comprising a delegation certificate signed by the first server, verifiable with the aid of the encryption key.

By virtue of the production method according to the invention, the first server can decide, if such is appropriate according to criteria specific to the first server, to provide a second server, which is not necessarily the third-party server to which the first server might already have delegated the delivery of the content, with an item of information relating to the delegation from the first to the second server. This item of information cannot be modified by the second server, but can be verified by the terminal to which the second server transmits it.

According to one aspect of the invention, the request message in respect of a delegation certificate further comprises an address of the client terminal.

Advantageously, the first server can thus take into account, during the analysis step, the address of the terminal requesting the content. This is useful since with the address it is possible to determine the geographical location, and, knowing that of the second server, the first server can determine whether the distance between the terminal and the second server is propitious to satisfactory delivery of the content.

According to one aspect of the invention, the request message in respect of a delegation certificate further comprises a signature of the third-party server.

Advantageously, the first server can thus take into account, during the analysis step, the signature of the third-party server. This is useful since this third-party server normally has at its disposal a valid delegation on the part of the first server, or in any event already has one at its disposal. The second server can therefore deduce that the second server has obtained a delegation of the third-party server, thereby strengthening the legitimacy of the second server to the first server.

According to one aspect of the invention, the delegation certificate response message further comprises a redirection instruction for the client terminal.

Whether or not the first server has decided to delegate delivery to the second server, the first server may invite the terminal to connect to a site determined by the first server, rather than remain connected to the second server. This site may for example be an information page warning that the second server is not an appropriate server for delivering the requested content, or be an alternative delivery server, preferable to the second server for example because of superior performance.

The various aspects of the production method which have just been described can be implemented independently of one another or in combination with one another.

The invention further relates to a method for requesting a delegation certificate, the delegation being from a first server to a second server, for delivery of a content referenced on the first server, and intended for a client terminal (UA), the method comprising the following steps implemented by the second server:
  reception of a request for establishment of a second encrypted connection between the terminal and the second server, comprising an identifier of the first server.

The requesting method is particular in that it further comprises the following steps:
  sending of a delegation certificate request message, destined for the first server, comprising an authenticity certificate of the second server,
  reception of a delegation certificate response message, originating from the first server, comprising a delegation certificate signed by the first server, verifiable with the aid of an encryption key associated with the first server,
  sending of a certification message destined for the terminal, comprising the delegation certificate, through the second encrypted connection, the terminal having previously obtained an encryption key associated with the first server, by means of a first encrypted connection between the terminal and the first server.

Thus, when the second server receives a request for establishment of a connection of a terminal wishing to consume a content referenced on the first server, the second server is able to prove that it has obtained a valid delegation on the part of the first server.

The invention further relates to a device for verifying a delegation certificate, the delegation being from a first server to a second server, for delivery of a content referenced on the first server, and intended for a client terminal, the device comprising a reprogrammable computing machine or a dedicated computing machine, able to and configured to:

send a first query message in respect of the content, destined for the first server, through a first encrypted connection between the terminal and the first server and by means of which the terminal has previously obtained an encryption key associated with the first server, receive a redirection message originating from the first server, comprising at least one identifier of a third-party server, obtain an address of the second server, on the basis of the at least one identifier received in the redirection message, send a request for establishment of a second encrypted connection between the terminal and the second server, comprising an identifier of the first server, receive a certification message originating from the second server, comprising a delegation certificate signed by the first server, through the second encrypted connection, verify the delegation certificate with the aid of the encryption key associated with the first server, send a second query message in respect of the content, destined for the second server, through the second encrypted connection, if the verified delegation certificate is valid.

This verification device, able to implement in all its embodiments the verification method which has just been described, is intended to be implemented in a client terminal or in an application included in the terminal such as a browser.

The invention further relates to a device for producing a delegation certificate, the delegation being from a first server to a second server, for delivery of a content referenced on the first server, and intended for a client terminal, the device comprising a reprogrammable computing machine or a dedicated computing machine, able to and configured to:

receive a query message in respect of the content, originating from the terminal, through a first encrypted connection between the terminal and the first server and by means of which the terminal has previously obtained an encryption key associated with the first server, send a redirection message destined for the terminal, comprising at least one identifier of a third-party server, receive a delegation certificate request message, originating from a second server, comprising an authenticity certificate of the second server, analyze the request for a delegation certificate, as a function of the result of the analysis, send a delegation certificate response message, destined for the second server, comprising a delegation certificate signed by the first server, verifiable with the aid of the encryption key.

This production device, able to implement in all its embodiments the production method which has just been described, is intended to be for example implemented in a content referencing server.

The invention also relates to a device for requesting a delegation certificate, the delegation being from a first server to a second server, for delivery of a content referenced on the first server, and intended for a client terminal, the device comprising a reprogrammable computing machine or a dedicated computing machine, able to and configured to:

receive a request for establishment of a second encrypted connection between the terminal and the second server, comprising an identifier of the first server, send a delegation certificate request message, destined for the first server, comprising an authenticity certificate of the second server, receive a delegation certificate response message, originating from the first server, comprising a delegation certificate signed by the first server, verifiable with the aid of an encryption key associated with the first server, send a certification message destined for the terminal, comprising the delegation certificate, through the second encrypted connection, the terminal having previously obtained an encryption key associated with the first server, by means of a first encrypted connection between the terminal and the first server.

This requesting device, able to implement in all its embodiments the requesting method which has just been described, is intended to be for example implemented in a content broadcasting server.

The invention also relates to a system for verifying a delegation certificate, comprising a verification device, a production device and a device for requesting a delegation certificate.

The invention envisages finally:

a computer program comprising instructions for the implementation of the steps of the verification method which has just been described, when this program is executed by a processor, as well as an information medium readable by a client terminal, and comprising instructions of this computer program, a computer program comprising instructions for the implementation of the steps of the production method which has just been described, when this program is executed by a processor, as well as an information medium readable by a content referencing server, and comprising instructions of this computer program, a computer program comprising instructions for the implementation of the steps of the requesting method which has just been described, when this program is executed by a processor, as well as an information medium readable by a content broadcasting server, and comprising instructions of this computer program.

These programs can use any programming language, and be in the form of source code, object code, or of code intermediate between source code and object code, such as in a partially compiled form, or in any other desirable form.

The information media can be any entity or device capable of storing the program. For example, such a medium can comprise a storage means, such as a ROM, for example a CD ROM or a microelectronic circuit ROM, or else a magnetic recording means, for example a diskette (floppy disk) or a hard disk.

Moreover, such an information medium can be a transmissible medium such as an electrical or optical signal, which can be conveyed via an electrical or optical cable, by radio or by other means. A program according to the invention can be in particular downloaded over a network of Internet type.

Alternatively, an information medium according to the invention can be an integrated circuit in which the program is incorporated, the circuit being adapted to execute or to be used in the execution of the methods in question.

4. PRESENTATION OF THE FIGURES

Figure 3:
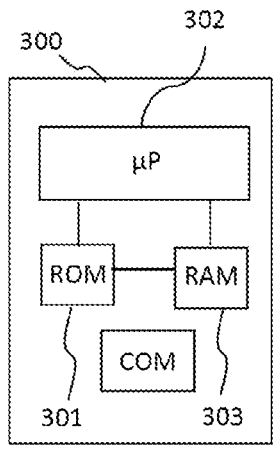
Figure 4:
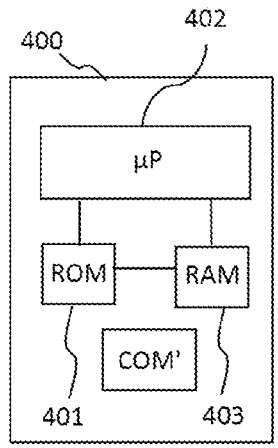
Figure 5:
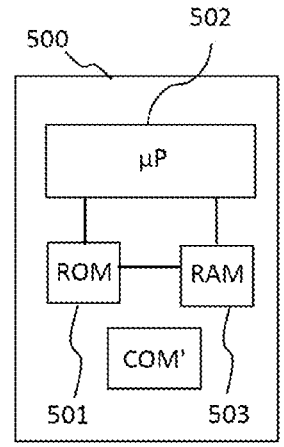
Figure 2:
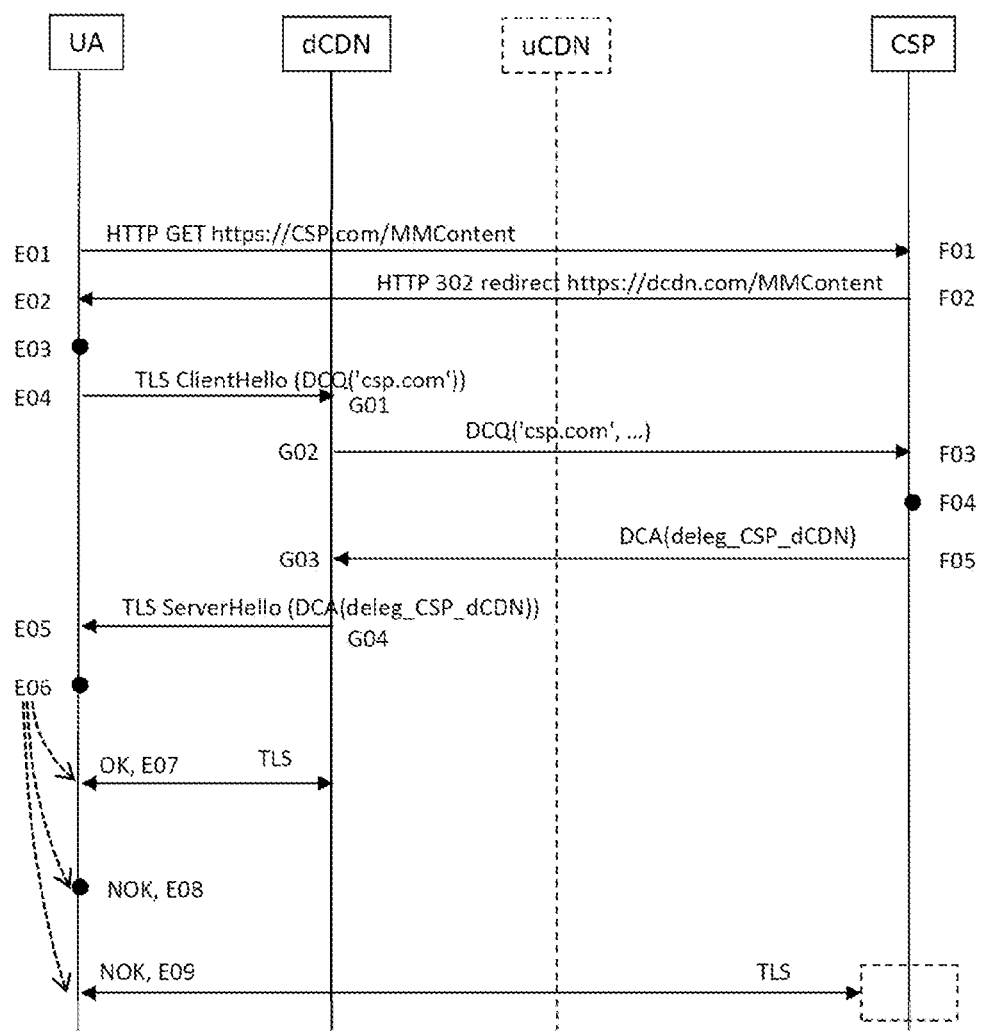

Other advantages and characteristics of the invention will be more clearly apparent on reading the following description of a particular embodiment of the invention, given by way of simple illustrative and nonlimiting example, and of the appended drawings, from among which:

FIG. 1 illustrates a network configuration situating the entities involved in the technique described, FIG. 2 presents an example of stringing together and implementing the steps of the method for requesting a delegation certificate, of the method for verifying a delegation certificate and of the method for producing a delegation certificate, according to one aspect of the invention, FIG. 3 presents an exemplary structure of a device for verifying a delegation certificate, according to one aspect of the invention, FIG. 4 presents an exemplary structure of a device for producing a delegation certificate, according to one aspect of the invention, FIG. 5 presents an exemplary structure of a device for requesting a delegation certificate, according to one aspect of the invention.

5. DETAILED DESCRIPTION OF AT LEAST ONE EMBODIMENT OF THE INVENTION

In the subsequent description, examples are presented of several embodiments of the invention based on the TLS and https protocols, but the invention may be based on other protocols, such as for example the HTTP1.1, SPDY, HTTP2, SCTP, DTLS and QUIC protocols.

A network configuration situating the entities involved in the technique described is now described in conjunction with FIG. 1. More particularly, the following entities are illustrated:

- a server CSP of a content provider referencing various contents (for example multimedia content, of the type comprising sounds, images or videos, or executable files) intended to be distributed to client terminals of end users;
- a client terminal UA, for example a computer, a smartphone of a user, seeking to obtain a content from the content provider, such a client terminal UA being able to embed onboard one or more client agents (or "User Agents") of the http (for "HyperText Transfer Protocol") or HTTPS (for "HyperText Transfer Protocol Secure") type or else of the Internet browser type;
- a content delivery server uCDN to which the server CSP of the content provider has delegated the delivery of the content in question and which is known to the server CSP of the content provider with the aid of a domain name;
- a content delivery secondary dCDN to which the content delivery primary uCDN has potentially delegated the delivery of the content sought by the user of the client terminal UA in a dual-delegation context;
- a domain name resolution server DNS making it possible to associate a domain name with a network address;
- a server CA of a certifying authority making it possible to deliver certificates, for example according to the HTTPS (for "HyperText Transfer Protocol Secure") protocol, to the servers in question.

The various entities presented hereinabove are then connected together via a telecommunications network 100, for example based on an Internet protocol, for the transmission of data.

In certain embodiments, a local domain name resolution server LDNS calls upon a central server DNS.

In certain embodiments, several servers CA of certifying authorities are used, each server being able to call upon a different server CA.

In other embodiments, the delivery servers uCDN and dCDN may be grouped together in one and the same hardware entity.

In yet other embodiments, further delivery servers are present, for example in a context of cascaded delegations.

FIG. 2 presents an example of stringing together and implementing the steps of the method for requesting a delegation certificate, of the method for verifying a delegation certificate and of the method for producing a delegation certificate, according to one aspect of the invention.

A user of a terminal UA wishes to consume a multimedia content MMContent, referenced by a content provider, whose identity he knows or has obtained in any way.

In an initial phase, not illustrated, for example with the aid of a search engine and a search on the basis of a name of the content or on the basis of the name of the content provider, the terminal UA retrieves the domain name of a server CSP associated with the content provider, on which the content MMContent is referenced. This address is for example in the form of a url (Uniform Resource Locator), such as 'csp-.com'.

During a step E01, known, with the aid of a specific application or of a generic browser, the terminal UA sends a query to obtain the content MMContent. For the sake of simplicity the term "terminal" is used in this document, but it may represent such an application or browser installed on the terminal.

This query to obtain the content is for example an http query using the https protocol, such as:

"http GET https://csp.com/MMContent".

This query follows up a procedure for establishing a secure TLS tunnel between the terminal UA and the server CSP. This procedure comprises the dispatching of a ClientHello TLS message by the UA. In response, the server CSP sends to the terminal UA a ServerHello message comprising cryptographic hardware such as for example a public key with which is associated a private key kept by the administrator of the CSP domain, or else a session ticket SessionTicket (such as described in RFC5077). The public key is in general attached to a certificate of the server CSP, which the server CSP obtained from any certifying authority. This hardware will allow the terminal UA to subsequently decrypt the content encrypted by the server CSP or by another server of the same domain 'csp.com'.

During a step F01, known, the server CSP receives the http query GET and identifies a third-party server, with which a relation of a contractual nature exists. This server is selected by the server CSP according to diverse criteria, such as for example proximity in terms of network with the terminal UA, or a user profile of the terminal UA.

During a step F02, known, the UA is gradually redirected to the server in charge of performing the delivery of the content.

In the case where delegation is simple, the third-party server is the one which performs the delivery of the content to the terminal UA. The third-party server is then the server dCDN.

In the case where delegation is multiple, that is to say the case where the third-party server does not perform the delivery of the content but has delegated it to another server, the third-party server is the server uCDN and this other server is the server dCDN.

In the case with simple delegation, during step F02, the server CSP also sends a redirection message to the terminal UA in response to the query "http GET https://csp.com/MMContent", comprising the address of the server dCDN, "dcdn.com". This redirection message is for example:

"http 302 redirect https://dcdn.com/MMContent", which the terminal UA receives during a step E02.

In the case with multiple delegation, several known schemes, based on HTTP and DNS compulsory redirections, or on alternate redirections, or on a combination of the two, have as final result that the terminal UA has at its disposal an address of the server dCDN, in the form of a url address or an IP address. The redirection message sent during step F02 is then, for example:

"http 302 redirect https://dcdn.com/MMContent", which the terminal UA receives during step E02.

In this case, during a step E03, the terminal UA obtains the IP address of the server dCDN through a DNS query on the domain name "dcdn.com".

It may also happen that one of the servers involved in the redirection, for example the server CSP, inserts a list of several server addresses into an alternate-redirection message sent during step F02. In this case, during step E03, the terminal UA obtains the IP address of the server dCDN after having performed a selection from among the server addresses included in the response, on criteria such as for example the proximity between the terminal UA and the servers of the list, the list being included in a response of out-of-band encoding type such as described in the document "https://tools.ietf.org/html/draft-reschke-http-oob-encoding-08.txt".

In all the cases presented hereinabove, at the end of step E03 the terminal UA has at its disposal a url to the domain 'dCDN.com' and the IP address of a server of 'dCDN.com', the server dCDN.

When the terminal UA has obtained the address of the server dCDN, it requests, during a step E04, the establishment of an encrypted session between itself and the server dCDN. This entails for example a secure TLS tunnel between the terminal UA and the server dCDN. This procedure comprises the dispatching of a ClientHello TLS message by the terminal UA. Accordingly, this message is sent by the terminal UA, received by the server dCDN during a step G01, comprising, in a preferred embodiment of the invention, a query to the server dCDN to prove that it has obtained a valid delegation on the part of a server of the domain 'csp.com'. This message may be for example a message according to a modification of the TLS protocol, comprising a delegation certificate query DCQ (for Delegation Challenge Query), such as:

"TLS ClientHello (DCQ('csp.com', options); SNI='dCDN.com')".

Optionally, the content of the message is signed with the aid of a key previously obtained by the terminal UA, such as for example a key of type SessionTicket, so that the server dCDN cannot modify the content of the query DCQ.

In order to obtain this proof required by the terminal UA, called a delegation certificate, the server dCDN must request it, or have previously requested it, from the domain 'csp.com'.

In a so-called synchronous mode, the delegation certificate query sent by the server dCDN during a step G02 is triggered by step E04. This mode is useful when for example no relation exists previously between the server CSP and the server dCDN, or when the delegation certificate in possession of the server dCDN is old and must be renewed. In this mode, optionally, the terminal UA can insert an item of information received beforehand, such as for example:

a signature of the redirection URL inserted by the server uCDN, the aim of which is to prove to the server dCDN that the query received from the terminal UA does actually originate from a redirection initiated by the server uCDN;

a SessionTicket received from the server CSP, the aim of which is to allow fast resumption of a TLS connection between the terminal UA and the server CSP.

In a second embodiment of the invention, so-called asynchronous mode, the server dCDN periodically requests this delegation certificate, independently of step E04, so as to be ready to provide at any moment, on request of a terminal such as the terminal UA, proof of recent delegation. In this asynchronous mode, step G02 is not triggered by step E04, but performed independently of the method for verifying a delegation according to the invention, or else in a query delegChallengeQuery('csp.com', options) performed previously by a terminal other than the terminal UA.

Steps G02, F03, F04, F05 and G03, described hereinbelow describe the method for producing a delegation certificate and are similar in synchronous or asynchronous mode.

During step G02, the server dCDN connects to the server CSP via a secure connection of TLS type where the 2 entities authenticate themselves mutually for example by exchanging certificates X.509. The server dCDN inserts, into a message that it sends to the server CSP, the delegation certificate request DCQ('csp.com', options) received from the terminal in the ClientHello( ) TLS message. Optionally the delegation request can be transmitted with the aid of an application protocol such as http (notably in API REST mode), smtp or ldap.

During a step F03, the server CSP receives from the server dCDN the message sent during step G02. It should be noted that the server receiving this message may be a server of the domain 'csp.com' different from the one that received during step F01 the content query on the part of the terminal UA. For simplicity these two servers, which are of the same domain 'csp.com' and may be merged into a single server, are both called "server CSP".

This message comprises a delegation certificate query such as

"DCQ('csp.com', options)", comprising for example:

'csp.com' is the name of the delegating domain, provided by the terminal UA;

"options" comprises a record OCSP of the certificate X.509 of dCDN obtained previously by the server dCDN from a certifying authority, denoted "dCDN_OCSP_Stapling"

Optionally the server CSP can obtain the record dCDN_OCSP_Stapling directly from the header TLS, or obtain it by interrogating the certifying authority which produced the certificate X.509 of the domain 'dCDN.com'.

During a step F04, the server CSP analyzes the delegation certificate request received.

Optionally, in synchronous mode, in the case where delegation is multiple, the delegation certificate request further comprises a field 'URL Signing' added by uCDN prior to step E02, and which the terminal UA transmitted to the server dCDN during step E04. Thus, the server CSP can verify that the server uCDN has actually delegated delivery of the content to another delivery server.

Optionally, in synchronous mode, in the case where a SessionTicket field is included in the query DCQ, the server CSP can then verify the authenticity of the delegation certificate query, so as to identify that it originates from a previously known terminal UA, or measure the redirection time when delegation is multiple, so as to determine whether the content delivery by the server dCDN satisfies a minimum performance requirement.

Optionally, in synchronous mode, the delegation certificate request further comprises an IP address of the terminal UA, obtained by the server dCDN during step G01. The IP address of the server dCDN being visible to the server CSP, the server CSP is thus able to determine the respective geographical locations of the terminal UA and of the server dCDN, and to estimate the quality of service resulting from the broadcasting of the content MMContent of the server dCDN to the terminal UA. If this quality is deemed insufficient by the server CSP, it can decide not to allot any delegation to the server dCDN.

During a step F05, the server CSP sends to the server dCDN a delegation certificate response to the request sent during step G02, which the server dCDN receives during step G03. This response message takes the form of a response using the same protocol as the query:

"DCA(deleg_CSP_dCDN)".

If, during the analysis step F04, the server CSP decided to authorize delegation of the delivery of the content to the server dCDN, the response message comprises the delegation certificate signed by the server CSP:

- "dCDN_OCSP_Stapling": the recent record OCSP of the certificate X.509 of the server dCDN;
- "CSP_OCSP_Stapling": a recent record OCSP of the certificate X.509 of the server CSP obtained previously by the server CSP from a certifying authority;
- a signature by the server CSP of the delegation certificate: CSP calculates an imprint of the two records "dCDN_OCSP_Stapling" and "CSP_OCSP_Stapling" with the aid of a hash function (SHA256), which it signs with the aid of the private key of its certificate X.509.

These three elements constitute what is called the delegation certificate.

If in the converse case, for one reason or another, the server CSP decided during the analysis step F04 to refuse to allot a delegation to the server dCDN, the response message may be empty, or comprise a token corresponding to a delegation refusal, signed with the aid of the private key of the certificate X.509 of 'csp.com'.

In an advantageous variant, the response message may, in the case of a delegation refusal, comprise a link to an alternative site or server, which the server CSP trusts, and to which the terminal UA can head. This alternative server may for example be a server that is more suitable for the type of terminal, in the case where the protocol used in the terminal UA and the server dCDN is the QUIC protocol (the server dCDN then adds the field UAID of the CHO, QUIC equivalent to the ClientHello TLS message, in the query DCQuery). In this case the response message is a type of HTTPS redirection containing a URL, thus presenting the advantage of constituting a replacement solution to complete cancellation of the delivery of the requested content by the server dCDN.

During a step G04, the server dCDN responds to the delegation certificate request which the terminal UA sent during step E04. This response message may be for example a message according to a modification of the TLS protocol, such as:

"TLS ServerHello (DCA(deleg_CSP_dCDN))",
 or "TLS ServerHello (DCA(PoD))".

This message comprises the response to the delegation certificate query, signed by the server CSP, which the server dCDN received during step G03.

The terminal UA receives this message during a step E05. During a step E06, the terminal UA verifies the signature of the delegation certificate: it decrypts the imprint with the aid of the public key of the certificate X.509 of 'csp.com' received during step E02, and calculates an imprint with the aid of the same hash function as that used by the signatory, and verifies that the decrypted imprint and the calculated imprint are indeed identical.

If the delegation certificate is authentic, during a step E07, the terminal UA finalizes the establishment of the TLS tunnel with the server dCDN, thereby allowing the delivery of the content MMContent of the server dCDN to the terminal UA.

If the delegation certificate is not valid, during a step E08, the terminal UA closes the TLS tunnel with the server dCDN, and the content MMContent is not delivered to the terminal UA.

In an advantageous variant, if the signature of the delegation certificate is authentic and the response message contains an instruction in respect of redirection to an alternative site or server, then, during a step E09, the terminal UA closes the TLS tunnel with the server dCDN, and sends an adapted query, so that it is directed toward the alternative site or server.

FIG. 3 presents an exemplary structure of a device for verifying a delegation certificate 300, allowing the implementation of a method for verifying a delegation certificate according to any one of the embodiments described hereinabove in conjunction with FIG. 2.

The validation device 300 comprises a random-access memory 303 (for example a RAM memory), a processing unit 302, equipped for example with a processor, and driven by a computer program stored in a read-only memory 301 (for example a ROM memory or a hard disk). On initialization, the code instructions of the computer program are for example loaded into the random-access memory 303 before being executed by the processor of the processing unit 302.

FIG. 3 illustrates only a particular embodiment, from among several possible particular embodiments, of the method for verifying a delegation certificate detailed hereinabove, in conjunction with FIG. 2. Indeed, the technique of the invention is carried out interchangeably on a reprogrammable computing machine (a computer PC, a processor DSP or a microcontroller) executing a program comprising a sequence of instructions, or on a dedicated computing machine (for example a set of logic gates such as an FPGA or an ASIC, or any other hardware module).

In the case where the invention is implanted on a reprogrammable computing machine, the corresponding program (that is to say the sequence of instructions) will be able to be stored in a removable or irremovable storage medium, this storage medium being partially or totally readable by a computer or a processor.

The validation device also comprises a communication module (COM) adapted to send content query messages, and connection establishment requests, and to receive redirection messages, and certification messages.

According to a particular embodiment of the invention, the processing unit comprises a software module for Internet navigation ("browser") or HTTP client suitable for implementing the method for verifying a delegation certificate according to any one of the particular modes previously described.

According to one embodiment, such a device for verifying a delegation certificate is included in a client terminal.

FIG. 4 presents an exemplary structure of a device for producing a delegation certificate 400, allowing the implementation of a method for producing a delegation certificate according to any one of the embodiments described hereinabove in conjunction with FIG. 2.

The device for producing a delegation certificate 400 comprises a random-access memory 403 (for example a RAM memory), a processing unit 402, equipped for example with a processor, and driven by a computer program stored in a read-only memory 401 (for example a ROM memory or a hard disk). On initialization, the code instructions of the computer program are for example loaded into the random-access memory 403 before being executed by the processor of the processing unit 402.

FIG. 4 illustrates just one particular way, out of several possible ways, of implementing the method for producing a delegation certificate detailed hereinabove, in conjunction with FIG. 2. Indeed, the technique of the invention is carried out interchangeably on a reprogrammable computing machine (a computer PC, a processor DSP or a microcontroller) executing a program comprising a sequence of instructions, or on a dedicated computing machine (for example a set of logic gates such as an FPGA or an ASIC, or any other hardware module).

In the case where the invention is implanted on a reprogrammable computing machine, the corresponding program (that is to say the sequence of instructions) will be able to be stored in a removable or irremovable storage medium, this storage medium being partially or totally readable by a computer or a processor.

The device for producing a delegation certificate also comprises a communication module (COM') adapted to send delegation certificate response messages, and redirection messages, and to receive content query messages, and delegation certificate request messages.

In one embodiment, such a device for producing a delegation certificate is included in a server, for example a server of a content provider able to reference said content.

FIG. 5 presents an exemplary structure of a device for requesting a delegation certificate 500, allowing the implementation of a method for requesting a delegation certificate according to any one of the embodiments described hereinabove in conjunction with FIG. 2.

The device for producing a delegation certificate 500 comprises a random-access memory 503 (for example a RAM memory), a processing unit 502, equipped for example with a processor, and driven by a computer program stored in a read-only memory 501 (for example a ROM memory or a hard disk). On initialization, the code instructions of the computer program are for example loaded into the random-access memory 503 before being executed by the processor of the processing unit 502.

FIG. 5 illustrates just one particular way, out of several possible ways, of implementing the method for requesting a delegation certificate detailed hereinabove, in conjunction with FIG. 2. Indeed, the technique of the invention is carried out interchangeably on a reprogrammable computing machine (a computer PC, a processor DSP or a microcontroller) executing a program comprising a sequence of instructions, or on a dedicated computing machine (for example a set of logic gates such as an FPGA or an ASIC, or any other hardware module).

In the case where the invention is implanted on a reprogrammable computing machine, the corresponding program (that is to say the sequence of instructions) will be able to be stored in a removable or irremovable storage medium, this storage medium being partially or totally readable by a computer or a processor.

The delegation certificate requesting device also comprises a communication module (COM") adapted to send delegation certificate request messages, and certification messages, and to receive delegation certificate response messages, and requests for establishment of a connection.

In one embodiment, such a device for requesting a delegation certificate is included in a content broadcasting server, for example a cache server able to broadcast the content.

The invention claimed is:

1. A verification method for verifying a delegation certificate, a delegation being from a first server to a second server, for delivery of a content referenced on the first server, and intended for a client terminal, the method comprising the following acts implemented by the client terminal:
   sending a first query message in respect of the content, destined for the first server, through a first encrypted connection between the client terminal and the first server and by which the client terminal has previously obtained an encryption key associated with the first server,
   receiving a redirection message, comprising at least one identifier of a third-party server,
   obtaining an address of the second server, on the basis of the at least one identifier received in the redirection message,
   sending a request for establishment of a second encrypted connection between the client terminal and the second server, comprising an identifier of the first server,
   receiving a certification message originating from the second server, comprising a delegation certificate signed by the first server, in response to the request for establishment of a second encrypted connection, and
   verifying the delegation certificate with the aid of the encryption key associated with the first server.

2. The verification method as claimed in claim 1, where the act of obtaining an address of the second server comprises selecting the address from among the at least one identifier of a third-party server, and/or interrogating an address resolution server with one of the at least one identifier of a third-party server.

3. The verification method as claimed in claim 1, further comprising finalizing the establishment of the second encrypted connection, and sending a second query message in respect of the content, destined for the second server, through the second encrypted connection, if the verified delegation certificate is valid.

4. The verification method as claimed in claim 1, where the certification message further comprises a redirection instruction and where the method further comprises redirecting the client terminal to a third server.

5. A production method for producing a delegation certificate, a delegation being from a first server to a second server, for delivery of a content referenced on the first server, and intended for a client terminal, the method comprising the following acts implemented by the first server:
- receiving a query message in respect of the content, originating from the client terminal, through a first encrypted connection between the client terminal and the first server and by means of which the client terminal has previously obtained an encryption key associated with the first server,
- sending a redirection message destined for the client terminal, comprising at least one identifier of a third-party server,
- receiving a delegation certificate request message, originating from a second server, comprising an authenticity certificate of the second server,
- sending a delegation certificate response message, destined for the second server, comprising a delegation certificate signed by the first server, verifiable with the aid of the encryption key.

6. The production method as claimed in claim 5, where the request message in respect of a delegation certificate further comprises an address of the client terminal.

7. The production method as claimed in claim 5, where the request message in respect of a delegation certificate further comprises a signature of the third-party server (uCDN).

8. The production method as claimed in claim 5, where the delegation certificate response message further comprises a redirection instruction for the client terminal.

9. A device for verifying a delegation certificate, a delegation being from a first server to a second server, for delivery of a content referenced on the first server, and intended for a client terminal, the device comprising:
- a reprogrammable computing machine or a dedicated computing machine, able to and configured to:
- send a first query message in respect of the content, destined for the first server, through a first encrypted connection between the client terminal and the first server and by which the client terminal has previously obtained an encryption key associated with the first server,
- receive a redirection message, comprising at least one identifier of a third-party server,
- obtain an address of the second server, on the basis of the at least one identifier received in the redirection message,
- send a request for establishment of a second encrypted connection between the client terminal and the second server, comprising an identifier of the first server,
- receive a certification message originating from the second server, comprising a delegation certificate signed by the first server, in response to the request for establishment of a second encrypted connection, and
- verify the delegation certificate with the aid of the encryption key associated with the first server.

10. A device for producing a delegation certificate, a delegation being from a first server to a second server, for delivery of a content referenced on the first server, and intended for a client terminal, the device comprising a reprogrammable computing machine or a dedicated computing machine, able to and configured to:
- receive a query message in respect of the content, originating from the client terminal, through a first encrypted connection between the client terminal and the first server and by means of which the client terminal has previously obtained an encryption key associated with the first server,
- send a redirection message destined for the client terminal, comprising at least one identifier of a third-party server,
- receive a delegation certificate request message, originating from a second server, comprising an authenticity certificate of the second server,
- send a delegation certificate response message, destined for the second server, comprising a delegation certificate signed by the first server, verifiable with the aid of the encryption key.

11. A non-transitory computer-readable recording medium comprising program code instructions stored thereon, which when executed by a processor of a client terminal configure the client terminal to perform acts comprising:
- verifying a delegation certificate, a delegation being from a first server to a second server, for delivery of a content referenced on the first server, and intended for the client terminal, the verifying comprising the following acts implemented by the client terminal:
- sending a first query message in respect of the content, destined for the first server, through a first encrypted connection between the client terminal and the first server and by which the client terminal has previously obtained an encryption key associated with the first server,
- receiving a redirection message, comprising at least one identifier of a third-party server,
- obtaining an address of the second server, on the basis of the at least one identifier received in the redirection message,
- sending a request for establishment of a second encrypted connection between the client terminal and the second server, comprising an identifier of the first server,
- receiving a certification message originating from the second server, comprising a delegation certificate signed by the first server, in response to the request for establishment of a second encrypted connection,
- verifying the delegation certificate with the aid of the encryption key associated with the first server.

* * * * *